United States Patent [19]

Jean et al.

[11] Patent Number: 5,316,985
[45] Date of Patent: May 31, 1994

[54] SUPPRESSION OF CRYSTAL GROWTH IN LOW DIELECTRIC INORGANIC COMPOSITION USING ULTRAFINE ALUMINA

[75] Inventors: Jau-Ho Jean, Export; Tapan K. Gupta, Monroeville, both of Pa.

[73] Assignee: Aluminum Company of America, Pittsburgh, Pa.

[21] Appl. No.: 804,069

[22] Filed: Dec. 9, 1991

[51] Int. Cl.$^5$ ............................................. C03C 8/22
[52] U.S. Cl. ............................................. 501/16; 501/32
[58] Field of Search ............ 501/16, 17, 15, 4, 5, 501/6, 32; 264/63, 61, 60; 156/89; 428/699, 901

[56] References Cited

U.S. PATENT DOCUMENTS

| | | | |
|---|---|---|---|
| 3,926,648 | 12/1975 | Miller | 106/39.6 |
| 4,642,148 | 2/1987 | Kurihara et al. | 156/89 |
| 4,672,152 | 6/1987 | Shinohara et al. | 174/68.5 |
| 4,755,490 | 7/1988 | DiLizzaro | 501/17 |
| 4,788,046 | 11/1988 | Barringer et al. | 423/122 |
| 4,849,379 | 7/1989 | McCormick | 501/20 |
| 4,879,261 | 11/1989 | Burn | 501/32 |
| 4,939,021 | 7/1990 | Aoki et al. | 428/209 |
| 5,071,793 | 12/1991 | Jean et al. | 501/16 |
| 5,071,794 | 12/1991 | Shaikh | 501/17 |
| 5,079,194 | 1/1992 | Jean et al. | 501/17 |
| 5,118,643 | 6/1992 | Jean et al. | 501/21 |
| 5,177,034 | 1/1993 | Jean et al. | 501/17 |

*Primary Examiner*—Karl Group
*Assistant Examiner*—A. Wright
*Attorney, Agent, or Firm*—David W. Pearce-Smith

[57] ABSTRACT

A ceramic composition for forming a ceramic dielectric body having a dielectric constant of less than about 5.0 and a TCE of 2.0–4.0 ppm/c. The composition is formed from a mixture comprising 25–50 weight percent of a low temperature glass selected from the group consisting of borosilicate glass, zinc borate glass and combinations thereof, 50–75 weight percent of a high temperature glass selected from the group consisting of high silica glass, titanium silicate glass and combinations thereof, and 1-10 weight percent of ceramic material having a particle size of less than about 3 microns. The mixture can be combined with a polymeric binder to produce an unfired green tape which is co-fireable with high conductivity metallurgies such as gold, silver and silver/palladium. A preferred ceramic material is colloidal alumina.

19 Claims, 1 Drawing Sheet

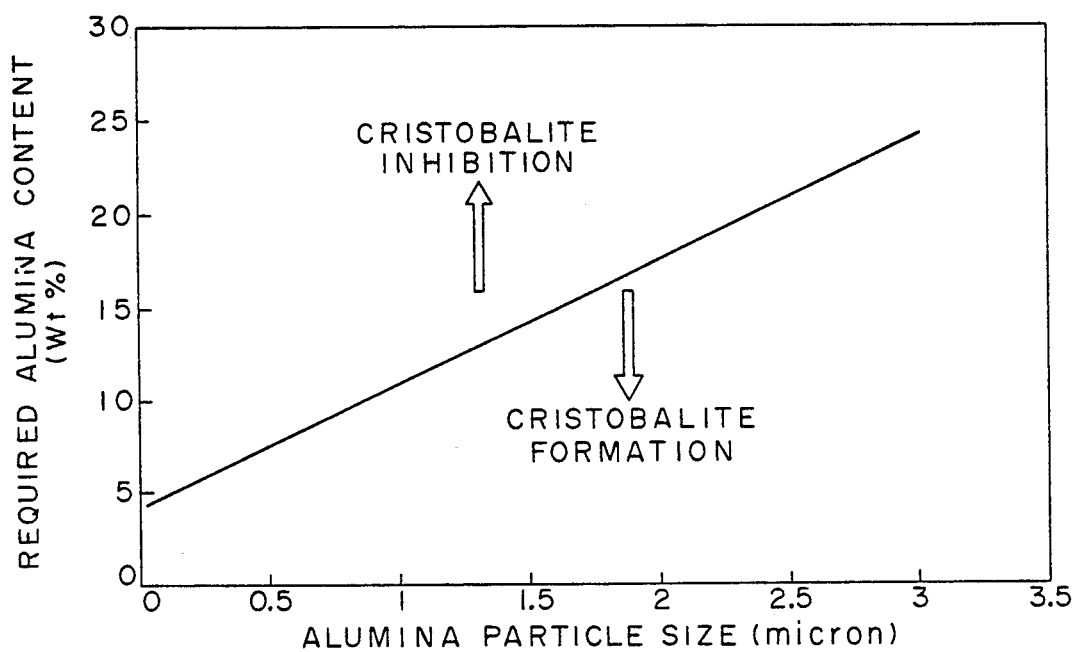

SUPPRESSION OF CRYSTAL GROWTH IN LOW DIELECTRIC INORGANIC COMPOSITION USING ULTRAFINE ALUMINA

FIELD OF THE INVENTION

The invention relates to ceramic compositions. More particularly the invention relates to glass and ceramic materials that are sintered at low temperature to produce dense bodies having a dielectric constant below 5.0.

BACKGROUND OF THE INVENTION

Conventionally, alumina ($Al_2O_3$) is used as a dielectric material for microelectronic packages. It has excellent electrical (insulating), thermal and mechanical (especially strength) properties. Alumina based packages, generally containing 4-10 wt. % glass, require sintering temperatures above 1500° C. which necessitates the use of refractory metals such as molybdenum or tungsten for the electrical interconnections so that the metal can be co-fired with the package. These metals have poor electrical conductivity as compared to highly conductive metals such as copper, and secondly, they require the use of strongly reducing atmospheres during co-firing necessitating expensive furnace systems.

The development of multilayer ceramic circuit boards is toward higher frequency, high density and higher speed devices. $Al_2O_3$ has a relatively high dielectric constant of about 9.9, causing high signal propagation delay and low signal-to-noise ratio (crosstalk). The signal propagation delay (t) in ceramic substrates is affected by the effective dielectric constant of the substrate (k') in the following equation:

$$t = (k')^{0.5}/C$$

where C is the speed of light. It can be found that the signal propagation delay can be dramatically reduced by a reduction in the effective dielectric constant of the substrate. For example, if the dielectric constant of a material is reduced from 10 (approximately the k' of $Al_2O_3$) to 5, the signal propagation delay can be reduced by 30%. A small signal delay is especially important for the substrate housing a chip with a very dense integrated circuit, for instance, very large scale integrated circuit (VLSI).

Furthermore, alumina has a coefficient of thermal expansion of about $7.4 \times 10^{-6}$/°C. (in the 20°-200° C. range) as compared to $3.4 \times 10^6$/°C. for silicon. This mismatch in thermal expansion results in design constraints and reliability concerns when attaching a silicon wafer to the substrate.

Heretofore, most of the dielectric materials used in multilayer circuits have been conventional thick film compositions. A typical circuit is constructed by sequentially printing, drying and firing functional thick film layers atop a ceramic substrate which is usually 92-96 wt. % $Al_2O_3$. The multiple steps required make this technology process intensive with the large number of process steps and yield losses contributing to high costs. Thick film technology nevertheless fills an important need in microelectronics and will continue to do so in the foreseeable future.

Recently, dielectric thick film compositions with a low dielectric constants of 5 have been introduced. However, ceramic substrates with low dielectric constants less than 5.0 and thermal expansion coefficients equal to that of silicon (3.4 ppm/°C.) and GaAs (6.1 ppm/°C.) are not readily available.

Low temperature co-fired (LTCF) technology has been recently introduced as a method for fabricating multilayer circuits. This technology offers the combination of the processing advantages of HTCF technology and the materials advantages of thick film technology. These LTCF tape systems have firing temperatures below 1000° C. and allow the use of high conductivity metals such as silver, gold, silver/palladium and copper (copper, however, requires reducing atmospheres). Most of these tape systems have dielectric constants between 6 and 8 and encompass a range of thermal coefficient of expansion (TCE).

A method for producing a multilayer ceramic circuit board for use with copper conductors is described in U.S. Pat. No. 4,642,148, issued to Kurihara et al. Ceramic compositions comprising 10-75 wt. % alpha-alumina, 5-70 wt. % non-crystalline quartz (fused silica), 20-60 wt. % borosilicate glass are disclosed. The dielectric constants of the fired materials ranged from 4.8 to 9.6.

U.S. Pat. No. 4,642,148 issued to Kurihara et al describes a method for producing a multilayer ceramic circuit board for use with copper conductors. Ceramic compositions comprising 10-75 wt. % alpha-alumina, 5-70 wt. % non-crystalline quartz (fused silica), 20-60 wt. % borosilicate glass are disclosed. The dielectric constants of the fired materials ranged from 4.8 to 9.6.

U.S. Pat. No. 4,672,152 issued to Shinohara et al describes a multilayer ceramic circuit board in which the ceramic is prepared from a mixture of 50-95 wt. % crystallizable glass and 5-50 wt. % ceramic filler. The material has a dielectric constant between 5.1 and 6.0 and a flexural strength above 150 MPa. The crystallizable glass consists of 5-20 wt. % lithium oxide, 60-90 wt. % silicon dioxide, 1-10 wt. % aluminum oxide and 1-5 wt. % alkaline metal oxide other than lithium oxide. The ceramic filler is selected from the group of silicon dioxide, $\beta$-eucryptite ($LiAlSiO_4$) and aluminum oxide.

U.S. Pat. No. 4,939,021 issued to Aoki et al describes a describes a multilayer ceramic copper circuit board comprising a glass/ceramic composite having a low dielectric constant and a low thermal expansion coefficient, and copper conductors having a low electrical resistivity. The glass/ceramic composite consists of a mixture of 3% to 75% by weight of mullite, 25% to 97% by weight borosilicate glass and 0% to 72% by weight quartz glass.

There exists a need for a low temperature co-fireable tape dielectric which (1) has a low dielectric constant (less than 5.0), (2) has a thermal expansion coefficient very close to the value for silicon (3.4 ppm/°C.), and (3) can be fired in air at a low temperature (less than 950° C.), thus permitting the use of high conductivity metallurgies such as gold, silver and silver/palladium.

The principal object of the invention is to provide a material that can be sintered into a body that has a dielectric constant of less than 5.0 at 1 MHz, a thermal expansion coefficient in the range of 2.0-4.0 ppm/°C.).

Another object of the invention is to provide ceramic materials that are sintered at temperatures less than 950° C. for 4-20 hours without significantly increasing their thermal coefficient of expansion.

Another object of the invention is to provide ceramic materials that are sintered at low temperatures to produce dense bodies (greater than 95% of theoretical density) having low coefficients of thermal expansion and a dielectric constant below 5.0 and have a glass content below 50 vol. %. A reduction in the glass content of the sintered body is very desirable in that the glassy phase is responsible for shape distortion or warpage during co-firing. If the sintered body is to be used in an electronic package, the shape distortion associated with high volume percent glass content can cause the via holes to misalign during co-firing of the metal and ceramic. A glass content below 50 vol. % will reduce the likelihood that warpage will occur.

These and other objects and advantages of the present invention will be more fully understood and appreciated with reference to the following description.

SUMMARY OF THE INVENTION

The invention is directed to a ceramic composition for forming a ceramic dielectric body having a dielectric constant of less than about 5.0 at 1 MHz and a TCE in the range of 2.0–4.0 ppm/°C., the composition being co-fireable with high conductivity metals such as gold, silver and silver/palladium. The composition is formed from a mixture comprising 25–50 weight percent of a low temperature glass selected from the group consisting of borosilicate glass, zinc borate glass and combinations thereof, 50–75 weight percent of a high temperature glass selected from the group consisting of high silica glass, titanium silicate glass and combinations thereof, and 1–10 weight percent of a ceramic material having a particle size of less than about 3 microns. The mixture can be combined with a polymeric binder to produce an unfired green tape which is co-fireable with high conductivity metallurgies such as gold, silver and silver/palladium.

In a second aspect, the invention is directed to a method of suppressing the formation of crystalline forms of silica in a ceramic body. The method comprises the steps of (a) adding 1–10 weight percent of a ceramic material having a particle size of less than about 3 microns to the unsintered mixture; and (b) sintering the mixture in air to a temperature not greater than about 1000° C.

In a further aspect, the invention is directed to a method of making a multilayer ceramic module comprising the steps of: (a) providing a mixture of comprising 1–10 weight percent of ceramic material having a particle size of less than about 3 microns to the unsintered mixture 25–50 wt. % borosilicate glass; (b) forming the mixture into green tape; (c) cutting the green tape into sheets; (d) forming via holes in the sheets; (e) forming patterns of electrically conductive paste on the sheets; (f) laminating a plurality of the sheets; and (g) firing the laminated sheets to a temperature below the melting point of the conductive paste.

In a yet another aspect, the invention is directed to a multilayer ceramic capacitor comprising layers of the above composition with conductor layers of copper therebetween, the assemblage having been fired to form a dense hermetic structure.

BRIEF DESCRIPTION OF THE DRAWINGS

Other features of the present invention will be further described or rendered obvious in the following relating description of the preferred embodiments which is to be considered together with the accompanying drawings, wherein:

FIG. 1 is a graphical illustration of required $Al_2O_3$ content to prevent cristobalite formation versus $Al_2O_3$ size.

DETAILED DESCRIPTION OF THE INVENTION

The preferred glass plus ceramic composition of the present invention comprises a mixture of two principal components: borosilicate glass and high silica glass. The percentages of each component may be varied within the ranges delineated below, depending on the final desired properties of the fired ceramic material. In addition to the two principal components, the present invention includes sufficient amounts of a third material, a ceramic, which acts to suppress the formation of crystalline forms of silica during the firing of the mixture of the borosilicate and high silica glass.

Dense ceramic bodies can be formed from such compositions by normal manufacturing techniques and low temperature (i.e., 850°–1000° C.) sintering. In a preferred application of the invention, such a mixture is formed into a thin tape, via holes punched through the tape at desired locations, and one or more metal conductor paths are formed on the punched tape. Suitable metals for the conductor paths include copper, silver, gold, platinum/gold and palladium/silver. The tape is subsequently sintered at low temperature, typically after two or more sections have been laminated together to form a multilayer circuit substrate.

It has been found that low firing temperature glass plus ceramic compositions can be made from mixtures containing less than 50 vol. % borosilicate glass. As stated above, a reduction in the glass content of the sintered body is very desirable in that the glassy phase is responsible for shape distortion or warpage during co-firing. A glass content below 50 vol. % will reduce the likelihood that warpage and misalignment of via holes will occur. Low firing temperature glass plus ceramic compositions of the invention are produced by providing a mixture of powdered ingredients, including 25–50 vol. % borosilicate glass and 50–75 vol. % high silica glass and sufficient amounts of crystalline ceramic materials to inhibit the formation of crystalline forms of silica.

The borosilicate glass is composed of $Al_2O_3$, $B_2O_3$, $CaO$, $K_2O$, $Li_2O$, $Na_2O$ and $SiO_2$ in amounts such that the mixture has a softening point of about 800° C. A quantity of the mixture is then formed into a desired shape using conventional procedures, and sintered at a temperature of at least 850° C., preferably 850°–950° C., and most preferably 900°–950° C. The sintering may be conducted in an oxidizing, neutral or reducing atmosphere.

The term "glass plus ceramic" is used herein to describe a sintered ceramic composition which is formed from a mixture of crystalline ceramics and glass. The ceramic and glass phases of the glass plus ceramic composition remain distinct after firing. The glass in a glass plus ceramic system retains its glassy characteristic after firing and is said to be a non-crystallizable glass in that composition. The glass is a "low temperature glass" in that it melts during firing to form a glassy matrix around the ceramic.

The ceramic in a glass plus ceramic system need not be a crystalline material; it may also be a glass. The ceramic, whether glassy or crystalline in nature, retains its initial characteristic after firing and is said to behave as a ceramic in that fired composition. If the ceramic is glassy, it is a "high temperature glass" in that it does not melts during firing. The term glass plus ceramic is used herein to distinguish systems containing non-crystallizable glasses from glass-ceramic systems in which the glass undergoes a controlled devitrification during firing and becomes crystalline.

The term "borosilicate glass" is used herein to describe a family of low temperature glasses containing 10–15 weight percent boron oxide ($B_2O_3$) and 75–85 weight percent silicon oxide ($SiO_2$).

The term "zinc borate glass" is used herein to describe a family of low temperature glasses containing 25–35 weight percent boron oxide ($B_2O_3$) and 65–75 weight percent zinc oxide (ZnO).

The term "high silica glass" is used herein to describe a family of glasses containing greater than 95 weight percent silicon oxide ($SiO_2$) and contains 3–4 wt. % $B_2O_3$ and 0–1 wt. % $Al_2O_3$.

The term "titanium silicate glass" is used herein to describe a family of silicates containing 1–20 wt. % $TiO_2$ and 80–99 wt. % $SiO_2$. Titanium silicate glass has a softening point of about 1400°–1500° C. depending on its composition. Since the titanium silicate glass does not soften when fired to temperatures below about 1000° C., it can therefore be said to behave like a crystalline filler. Thus, the use of titanium silicate glass will not contribute to shape distortion or warpage during co-firing. As stated above, the shape distortion associated with high volume percent glass content can cause the via holes in the electronic package to misalign during co-firing of the metal and ceramic.

In addition to titanium silicate glass being refractory, it does not normally devitrify when used in a ceramic composition which is fired below 1000° C. In this regard, titanium silicate glass, which usually contains about 93 wt. % $SiO_2$, is different from "fused silica glass" which is virtually 100% $SiO_2$.

The cristobalite and quartz phases formed during firing remain on cooling. Cristobalite has a TCE of about $50 \times 10^{-6}/°C$. (in the 20°–300° C. range) and quartz has a TCE of about $13 \times 10^{-6}/°C$. as compared to $3.5 \times 10^{-6}/°C$. for silicon. The presence of cristobalite and/or quartz in the fired product raises the TCE and lowers the mechanical strength of the product. The loss of mechanical strength is due to the volume change associated with phase transformation which generates microcracks. Titanium silicate glass will not normally form cristobalite crystallites when it is fired to temperatures below about 1000° C.

Both the high silica glass and the titanium silicate glass have a softening point greater than 1500° C. and do not devitrify when used in a ceramic composition which is fired below 1000° C. They can, therefore, be said to behave like a crystalline filler since they remain distinct from the other ceramic components of the material.

The cristobalite and quartz phases formed during firing remain in the material on cooling. Cristobalite has a TCE of about $50 \times 10^{-6}/°C$. (in the 20°–300° C. range) and quartz has a TCE of about $13 \times 10^{-6}/°C$. as compared to $3.5 \times 10^{-6}/°C$. for silicon. The presence of cristobalite and/or quartz in the fired product raises the TCE and lowers the mechanical strength of the product. The loss of mechanical strength is due to the volume change associated with phase transformation which generates microcracks.

The term "crystalline ceramic material" is used herein to describe a family of refractory ceramic materials containing low levels of elements selected from Group IA of the periodic table. The term crystalline ceramic material is intended to include, but is not limited to alumina ($Al_2O_3$), barium oxide (BaO), cordierite ($Mg_2Al_4Si_5O_{18}$), magnesium oxide (MgO), titania ($TiO_2$), mullite ($Al_6Si_2O_{13}$), magnesium titanate ($MgTiO_3$), spinel ($MgAl_2O_4$), forsterite ($2MgO.SiO_2$), steatite ($MgO.Si_2$), aluminum phosphate ($AlPO_4$), aluminum titanate ($Al_2TiO_5$), dolomite ($CaCO_3.MgCO_3$), anorthite ($CaO.Al_2O_3.2SiO_2$), wollastonite ($CaSiO_3$), talc ($Mg_3Si_4O_{10}(OH_2)$), sillmanite ($Al_2SiO_5$), silicon nitride ($Si_3N_4$), aluminum oxynitride (AlON), $CaZrO_3$, AlN, $ZnO.SiO_2$, $ZrO_2$, $ZrO_2.SiO_2$ $GA_3O_3$, $Ga_2TiO_5$, $Ga_2TiO_5$, GaAs, $GaPO_4$ and combinations thereof.

The term crystalline ceramic material is not intended to include the various crystalline forms of silica ($SiO_2$) which include quartz, tridymite, flint and cristobalite. As stated above the presence of crystalline phases of silica, such as quartz and cristobalite, remain in the material during firing and on cooling and its presence in the fired product raises the TCE and lowers the mechanical strength of the product. Linear thermal expansion coefficients for polymorphoric forms of silica and glasses are shown in Table 1.

TABLE 1

| Composition | Thermal Coefficient of Expansion | | | |
|---|---|---|---|---|
| | 20°–100° C. | 20°–200° C. | 20°–300° C. | 20°–600° C. |
| Quartz | 11.2 | — | 13.2 | 23.7 |
| Cristobalite | 12.5 | — | 50.0 | 27.1 |
| Tridymite | 17.5 | — | 25.0 | 14.4 |
| Fused Silica Glass | — | 0.5 | — | — |
| High Silica Glass | — | 0.7 | — | — |
| Borosilicate Glass | — | 3.3 | — | — |

The term "finely divided" is used herein to describe material that is ground to less than about 5 microns in size.

The glasses can be prepared by conventional glass-making techniques by mixing the desired components in the desired proportions and heating the mixture to form melt. As is well known in the art, heating is conducted to a peak temperature and for a time such that the melt becomes entirely liquid and homogeneous.

The above-described glasses are particularly desirable for use in electronic packages, such as VLSI applications, because of their low polarizability and thus low dielectric constant. Because borosilicate glasses by themselves tend to have low softening points, it is necessary to increase the softening point by the addition of large amounts of other glasses which have high $SiO_2$ concentrations. High silica glasses are more durable than those with high $B_2O_3$ concentrations.

A preferred borosilicate glass is sold under the trade name of Corning 7740 comprises about 2 wt. % $Al_2O_3$, 13 wt. % $B_2O_3$, 4 wt. % $Na_2O$, and 81 wt. % $SiO_2$. The amount of borosilicate glass used affects the sintering temperature. If too little borosilicate glass is used (for example, less than about 25 vol. % in this embodiment), the sintering temperature will be too high to achieve the benefits of the present invention. Maintaining the proportion of borosilicate glass within the range of about 25–50 vol. % is necessary to obtain these benefits.

A preferred high silica glass composition is sold under the tradename Corning 7913 and contains 0.5 wt. % alumina, 3 wt. %, $B_2O_3$ and 96.5 wt. % $SiO_2$.

The following examples illustrate preferred ranges of components of the glass plus ceramic compositions of the invention. In each example, the borosilicate glass is Corning's 7740 and the high silica glass is Corning's 7913.

EXAMPLES 1-7

Borosilicate glass (Corning 7740) and high silica glass (Corning 7913) were separately ground in a 1.3 gallon ball mill for 16 hours to obtain a particle size of 2-4 microns. Seven compositions were formed from mixtures of the borosilicate glass, high silica glass, and alumina crystallization inhibitor. The weight percents of the inorganic compositions are listed in Table 2.

The alumina crystallization inhibitor used in Examples 1-7 is Alcoa's A17SG alumina powder, which has a median size of 3 microns, determined by the sedimentation method. The alumina powder is used as received.

The mixtures of Examples 1-7 with various concentrations of borosilicate glass, high silica glass, and alumina are combined with a 5 wt. % polyethylene glycol binder and 50 wt. % 1-propanol and mixed for 2 hours in a turbular mixer. The powder is then oven dried at 80° C. for 2 hours and screened. The powder is then dry pressed into 1.9 cm diameter, 0.3 cm high pellets by compressing the milled mixture in a mold at 13,000 psi (910 kg/cm$^2$). The pellets are then fired in air. The firing is performed in two steps. The first step is to burn the binder out. This is accomplished by heating the pellets to 500° C. and holding for 1 hour. Next the pellets are sintered isothermally at 950° C. for 4 hours.

The crystallinity of the fired samples is analyzed using X-ray diffraction, and the results of intensity of 100 peak for cristobalite for Examples 1-7 are listed in Table 2. The amount of cristobalite present in the fired samples was found to decrease as the alumina content increased. Only after the alumina increased to 24.1% and beyond (Examples 6 and 7), the cristobalite completely disappeared from the fired samples.

TABLE 2

| Sample | Composition (wt. %) BSG | HSG | A-17SG | Sintering Temperature (°C.) | XRD (c/s) (100) Cristo. |
|---|---|---|---|---|---|
| 1 | 50.6 | 49.4 | 0 | 950 | 16625 |
| 2 | 50.2 | 48.0 | 1.8 | 950 | 6716 |
| 3 | 49.6 | 46.0 | 4.4 | 950 | 2570 |
| 4 | 48.6 | 42.8 | 8.6 | 950 | 433 |
| 5 | 46.8 | 36.6 | 16.6 | 950 | 50 |
| 6 | 45.1 | 30.8 | 24.1 | 950 | 0 |
| 7 | 43.5 | 25.5 | 31.0 | 950 | 0 |

EXAMPLES 8-11

The procedure of Examples 1-7 was repeated except that the alumina crystallization inhibitor used in this Example is Alcoa A16SG powder, which has a median particle size of 0.6 micron, determined by the sedimentation method. Table 3 lists the weight percents of the inorganic compositions used in this Examples 8-11.

The fired samples of the compositions in Table 3 have a relative sintered density of greater than 97%, fired at 950° C. for 4 hours. The crystallinity of the fired samples was analyzed by X-ray diffraction, and the peak intensity of cristobalite (100) is listed in Table 3.

As with Examples 1-7, the peak intensity for Examples 8-11 is found to decrease as alumina content increases. However, after the alumina increased to 8.6% and beyond (Examples 10 and 11), the cristobalite completely disappeared from the fired samples.

Thermal expansion coefficients (TCE) were determined in the temperature range from room temperature to 300° C. using a push-rod dilatomater, and the results are listed in Table 3. It is found that the compositions with 8.6 wt. % and 16.6 wt. % alumina have a TCE of 3.3 and 3.52 ppm/°C., respectively. Dielectric constant was measured by an HP 4192 AC impedance at 1 MHz, and the results are given in Table 3. All of the compositions investigated in this Example have a dielectric constant in the range of 4.4-4.9.

TABLE 3

| Sample | Composition (wt. %) BSG | HSG | A-16SG | Sint. Temp. (°C.) | XRD (c/s) (100) Crist. | TCE (ppm/°C.) (20-300° C.) | K' (1 MHz) |
|---|---|---|---|---|---|---|---|
| 8 | 50.2 | 48.0 | 1.8 | 950 | 1645 | 6.45 | 4.45 |
| 9 | 49.6 | 46.0 | 4.4 | 950 | 100 | 2.95 | 4.50 |
| 10 | 48.6 | 42.8 | 8.6 | 950 | 0 | 3.30 | 4.59 |
| 11 | 46.8 | 36.6 | 16.6 | 950 | 0 | 3.52 | 4.85 |

EXAMPLES 12-13

The procedure of Examples 1-7 was repeated except that the alumina crystallization inhibitor used is Nycol Al-200 colloidal alumina, which has an average particle size of about 0.02 micron. Table 4 lists the compositions of Examples 12-13. The crystallinity of the samples were also analyzed by X-ray diffraction, and the results of the peak intensity of cristobalite (100) are also listed in Table 4.

As with the previous Examples, the peak intensity of cristobalite (100) for Examples 12-13 is found to decrease as alumina content increases. However, after the alumina increased to 4.4% (Example 13), the cristobalite completely disappeared from the fired sample.

TCE data show that the composition with cristobalite (Example 12), 4.14 ppm/°C., has a larger TCE than that without cristobalite (Example 13), 2.67 ppm/°C. Both compositions, however, have a dielectric constant of about 4.4-4.5 at 1 MHz.

TABLE 4

| Sample | Composition (wt. %) BSG | HSG | Al-20 | Sint. Temp. (°C.) | XRD (c/s) (100) Crist. | TCE (ppm/°C.) (20-300° C.) | K' (1 MHz) |
|---|---|---|---|---|---|---|---|
| 12 | 50.2 | 48.0 | 1.8 | 950 | 621 | 4.14 | 4.43 |
| 13 | 49.6 | 46.0 | 4.4 | 950 | 0 | 2.67 | 4.51 |

The products of Examples 1–13 illustrate that the growth of cristobalite precipitate during firing can be completely prevented by the addition of a small amount of alumina. Surprisingly, the amount of required $Al_2O_3$ content to prevent cristobalite formation increases with increasing $Al_2O_3$ size, from 4.4 wt. % for 0.02 micron to 24.1 wt. % for 3 microns (see FIG. 1). The TCE of the products of Examples 9–13 are very close to that of silicon (3.4 ppm/C), which is very desirable for multilayer ceramic packaging. Since alumina has a coefficient of thermal expansion of about $7.4 \times 10^{-6}$/°C. (in the 20°–200° C. range) as compared to $3.4 \times 10^{-6}$/°C. for silicon, a reduction in the amount of alumina required to prevent the precipitation of cristobalite in the fired material will reduce its TCE.

In addition, the materials of Examples 8–13 have low dielectric constants (4.4–4.8 at 1 MHz) which is very desirable to reduce the signal propagation delay in the ceramic substrate. Since the dielectric constant of $Al_2O_3$ is approximately 10, a reduction in the amount of alumina required to prevent the precipitation of cristobalite in the fired material will reduce the signal propagation delay of the fired material. A small signal delay is especially important for the substrate housing a chip with a very dense integrated circuit, for instance, very large scale integrated circuit (VLSI).

The products of Examples 8–13 contain a low glass content (25–50 vol. %) which is much less than those reported in the literature (greater than 60 vol. %). A low glass content is very desirable, because the shape distortion can be avoided during co-firing. The products of Examples 8–13 had high sintered densities (greater than 95% of the theoretical density) obtained at temperatures of 800°–950° C. in air. The sintering temperatures are compatible with those of precious metals, e.g., Au and Ag-Pd, which will enable the compositions to be utilized in a co-firable ceramic/metal electronic packaging system.

The materials of Examples 8–13 can be used to form multilayer high frequency circuit packages. To form dielectric layers for multilayer high frequency circuit packages, the starting materials are ground in a ball mill until they have an average particle size of 2–4 microns. As noted above, the finer the alumina that is used the less alumina is needed to reduce the formation of cristobalite.

A slurry is then formed by combining the finely ground powder with a suitable solvent and other conventional additives, such as a plasticizer and a binder, in a manner known in the art. The slurry is cast into thin "green" (unfired) sheets having a thickness of about 75 to 400 microns using a conventional doctor blading process, after which the green sheets are blanked into individual 125 mm square sheets or tapes. Via holes next are formed in the green sheets by a die punching process. The holes suitably may have a diameter of about 125 microns. A conductor paste is applied in a desired pattern to the punched sheets using a screen printing process. The paste is also applied within the via holes to form connections between conductor patterns. The principal metallic constituent of the paste may be gold, silver, copper, silver/palladium alloy, gold/platinum alloy, or other suitable materials. The printed green sheets are then stacked in a desired sequence using alignment holes to insure correct positioning, and laminated together at 50°–100° C. under a pressure between about 35 and 250 kg/cm². Finally, the laminated green sheets are fired at a temperature not exceeding 1000° C. to form dense, sintered ceramic multilayer circuit substrates. The firing may be done in air if the conductor metal is not susceptible to oxidation at the firing temperature. Such is the case, for example, with the metals named above, except for copper, which requires a reducing or neutral atmosphere. Sheets formed in the manner described will have a lower glass content (25–50 vol. %) and therefore a lower tendency to bow or warp.

The compositions of the present invention also can be used to form rigid, nonporous ceramic bodies by substantially conventional techniques. For example, the batch ingredients of any of the previous examples are combined with water and organic binders, and ball milled for a period of about 20 hours. The resulting slurry is spray dried to provide a powder of substantially spherical particles. This powder can be used to form bodies of various desired shapes by standard forming techniques, such as dry or isostatic pressing. The bodies are then fired at a suitable temperature not exceeding 1000° C. to provide dense, sintered ceramic objects.

Although the invention has been described in terms of a high silica glass, it is contemplated that other forms of silica may be used in practicing the present invention. However, it is not believed that quartz and/or cristobalite can be used because of their high TCE. In addition, it is not desirable to use fused silica that will devitrify when fired to temperatures of up to 1000° C.

Although the invention has been described in terms of using alumina as a crystal growth inhibitor, aluminosilicates and other ceramic materials containing low levels of alkali ions may also be used in practicing the present invention.

Although applicants do not wish to be bound by any theories, it is presently believed that the mechanism of crystallization inhibition is related to the migration of alkali ions in the borosilicate glass to the interface with the crystallization inhibitor. Photomicrographs of microprobe have revealed that when alumina is used as a crystallization inhibitor, sodium ion in the borosilicate glass migrate toward the alumina/glass interface during firing of the mixture. At the same time $Al_2O_3$ migrates into the glass. It is believed that the segregation of alkali ions in the glass toward alumina/glass interface suppresses the tendency of the glass to undergo phase separation at or near the firing temperature of the mixture. This phase separation is believed to be a precursor to crystallization of the glass.

It is further believed that ceramic materials containing alkali ions will reduce the migration of the alkali ions in the borosilicate glass and thus reduce the inhibition of crystal growth that would otherwise be expected. Alkali ions such as potassium are known to increase the dielectric loss of ceramic, which is very undesirable. It is believed that materials that are for all practical purposes alkali-free, such as alumina ($Al_2O_3$), barium oxide (BaO), cordierite ($Mg_2Al_4Si_5O_{18}$), magnesium oxide (MgO), titania ($TiO_2$), mullite ($Al_6Si_2O_{13}$), magnesium titanate ($MgTiO_3$), spinel ($MgAl_2O_4$), forsterite ($2MgO.SiO_2$), steatite ($MgO.Si_2$), aluminum phosphate ($AlPO_4$), aluminum titanate ($Al_2TiO_5$), dolomite ($CaCO_3.MgCO_3$), anorthite ($CaO.Al_2O_3.2SiO_2$), wollastonite ($CaSiO_3$), talc ($Mg_3Si_4O_{10}(OH_2)$), sillmanite ($Al_2SiO_5$), silicon nitride ($Si_3N_4$), aluminum oxynitride (AlON), $CaZrO_3$, AlN, $GA_3O_3$, $Ga_2TiO_5$, $Ga_2TiO_5$, GaAs, $GaPO_4$, $ZnO.SiO_2$, $ZrO_2$ and $ZrO_2.SiO_2$, may be used as crystal growth inhibitors in practicing the present invention.

In addition, although the invention has been described in terms of using a 1-10 wt. % of a cristobalite crystal growth inhibitor, other amounts may also be used in practicing the present invention. The key is that enough ceramic material be used to cause the desired inhibition of crystal grain growth without introducing other undesirable properties. Thus, for example, if alumina is used as a grain growth inhibitor, a small addition (i.e. 1-10 wt. %) will produce the desired effect. However, if a larger amount of alumina is used (i.e. 20 wt. %), the TCE of alumina ($7.4 \times 10^{-6}$/°C. (in the 20°-300° C. range)) will raise the overall TCE for the fired body and the resulting mismatch in thermal expansion between the fired body and a silicon will result in design constraints and reliability concerns when attaching a silicon wafer to the fired body.

It will be apparent to those skilled in the relevant art that various changes and modifications may be made in the embodiments described above to achieve the same or equivalent results without departing from the principles of the present invention as described and claimed herein. All such changes and modifications are intended to be covered by the following claims.

What is claimed is:

1. A ceramic composition for forming a ceramic dielectric body having a sintered density greater than 97% and a dielectric constant of less than about 5.0, said composition comprising a mixture of:
    (a) 25-49 weight percent of a low temperature glass selected from the group consisting of borosilicate glass, zinc borate glass and combinations thereof;
    (b) 50-75 weight percent of a high temperature glass selected from the group consisting of high silica glass, titanium silicate glass and combinations thereof; and
    (c) 1-8 weight percent of crystalline ceramic material having an average particle size of less than about 1 micron, said crystalline ceramic material selected from the group consisting of alumina, cordierite, mullite, magnesia, spinel, forsterite, steatite, aluminum phosphate ($AlPO_4$), aluminum nitride, aluminum titanate, barium oxide, titania, magnesium titanate, dolomite, anorthite, wollastonite, talc, sillmanite, silicon nitride, aluminum oxynitride, $CaZrO_3$, $MgO.Al_2O_3$, $ZnO.SiO_2$, $ZrO_2$, $ZrO_2.SiO_2$ and combinations thereof.

2. The ceramic composition of claim 1 in which said crystalline ceramic material is colloidal alumina.

3. The ceramic composition of claim 1 in which said low temperature glass is a borosilicate glass having a composition comprising 0-3 wt. % alumina, 20-30 wt. %, $B_2O_3$, 0-3 wt. % CaO, 0-3 wt. % $K_2O$, 0-3 wt. % $Li_2O$, 0-3 wt. % $Na_2O$, and 60-80 wt. % $SiO_2$.

4. The ceramic composition of claim 1 in which said low temperature glass is a zinc borate glass comprising 25-35 wt. % $B_2O_3$ and 65-75 wt. % ZnO.

5. The ceramic composition of claim 1 in which said low temperature glass is a high silica glass comprising 0-1 wt. % alumina, 0-5 wt. %, $B_2O_3$, 95-98 wt. % $SiO_2$, and the remainder incidental impurities.

6. The ceramic composition of claim 1 wherein the formed ceramic dielectric body has a thermal expansion coefficient in the range of about 3.0-4.0 ppm/°C.

7. A method of suppressing the formation of crystalline forms of silica in a ceramic body that devitrifies to form crystalline forms of silica during firing having a sintered density greater than 97%, said method comprising the steps of:
    (a) adding 1-8 weight percent of crystalline ceramic material other than silica having an average particle size of less than about 3 microns to the unsintered mixture, said crystalline ceramic material selected from the group consisting of alumina, cordierite, mullite, magnesia, spinel, forsterite, steatite, aluminum phosphate ($AlPO_4$), aluminum nitride, aluminum titanate, barium oxide, titania, magnesium titanate, dolomite, anorthite, wollastonite, talc, sillmanite, silicon nitride, aluminum oxynitride, $CaZrO_3$, $MgO.Al_2O_3$, $ZnO.SiO_2$, $ZrO_2$, $ZrO_2.SiO_2$ and combinations thereof; and
    (b) sintering the mixture in air to a temperature not greater than about 1000° C.

8. The method of claim 7 in which step (a) includes adding said crystalline ceramic material having an average particle size of less than about 1 micron.

9. The method of claim 7 in which step (a) includes adding said crystalline ceramic material having an average particle size of less than about 0.5 micron.

10. A method of making a ceramic dielectric body having a sintered density greater than 97% and a dielectric constant of less than about 5.0, comprising the steps of:
    (a) providing a mixture consisting essentially of finely divided particles of comprising 25-50 wt. % borosilicate glass, 50-75 wt. % high silica glass and 1-8 weight percent of crystalline ceramic material having an average particle size of less than about 1 micron, said crystalline ceramic material selected from the group consisting of alumina, cordierite, mullite, magnesia, spinel, forsterite, steatite, aluminum phosphate ($AlPO_4$), aluminum nitride, aluminum titanate, barium oxide, titania, magnesium titanate, dolomite, anorthite, wollastonite, talc, sillmanite, silicon nitride, aluminum oxynitride, $CaZrO_3$, $MgO.Al_2O_3$, $ZnO.SiO_2$, $ZrO_2$, $ZrO_2.SiO_2$ and combinations thereof; an d
    (b) sintering the mixture in air to a temperature not greater than about 1000° C.

11. The ceramic composition of claim 10 in which said ceramic material is colloidal alumina.

12. A multilayer ceramic board having a sintered density greater than 97% and formed of a plurality of laminated circuit board units, each unit including a ceramic insulating layer, a patterned electrical conductor layer supported on said ceramic insulating layer and through hole electrical conductors for connecting said patterned electrical conductor layers of said respective ceramic circuit board units to form a predetermined wiring circuit, said electrical conductor layers and said through hole electrical conductors selected from the group of gold, silver and palladium said ceramic insulating layer formed from a mixture comprising:

25-49 wt. % borosilicate glass, 50-75 wt. % high silica glass and 1-8 wt. % crystalline ceramic material having an average particle size of less than about 1 micron, said crystalline ceramic material selected from the group consisting of alumina, crystalline aluminosilicates, aluminum phosphate ($AlPO_4$), aluminum nitride, aluminum titanate, barium oxide, titania, magnesium titanate, dolomite, anorthite, wollastonite, talc, sillmanite, silicon nitride, aluminum oxynitride, $CaZrO_3$, $MgO.Al_2O_3$, $ZnO.SiO_2$, $ZrO_2$, $ZrO_2.SiO_2$ and combinations thereof, said ceramic insulating layer sintered at a temperature below the melting temperature of said patterned electrical conductor layers and said through hole electrical conductors.

13. The multilayer ceramic circuit board of claim 12 in which said ceramic material comprises alumina.

14. The multilayer ceramic circuit board of claim 12 in which said ceramic material is colloidal alumina.

15. The multilayer ceramic circuit board of claim 12 in which said ceramic material has an average particle size of less than about 0.1 microns.

16. A method of making a multilayer ceramic package having a sintered density greater than 97% comprising the steps of:
    (a) providing an unsintered mixture of comprising 1-8 weight percent of crystalline ceramic material having an average particle size of less than about 3 microns to the unsintered mixture 25-50 wt. % borosilicate glass, said crystalline ceramic material selected from the group consisting of alumina, crystalline aluminosilicates, aluminum phosphate ($AlPO_4$), aluminum nitride, aluminum titanate, barium oxide, titania, magnesium titanate, dolomite, anorthite, wollastonite, talc, sillmanite, silicon nitride, aluminum oxynitride, $CaZrO_3$, $MgO \cdot Al_2O_3$, $ZnO \cdot SiO_2$, $ZrO_2$, $ZrO_2 \cdot SiO_2$ and combinations thereof;
    (b) forming said mixture into green tape;
    (c) cutting said green tape into sheets;
    (d) forming via holes in said sheets;
    (e) forming patterns of electrically conductive paste on said sheet;
    (f) laminating a plurality of said sheets; and
    (g) firing said laminated sheets in air to a temperature below the melting point of said conductive paste and below 1000° C.

17. The method of claim 16 in which step (e) comprises screening metallic paste formed from materials selected from the group consisting of gold, silver, copper, silver/palladium alloy, gold/platinum alloy and combinations thereof.

18. The method of claim 16 in which said ceramic material comprises crystalline aluminosilicate.

19. The method of claim 16 in which said ceramic material has an average particle size of less than about 0.1 microns.

* * * * *

UNITED STATES PATENT AND TRADEMARK OFFICE
CERTIFICATE OF CORRECTION

PATENT NO. : 5,316,985
DATED : May 31, 1994
INVENTOR(S) : Jau-Ho Jean and Tapan K. Gupta It is certified that error appears in the above-indentified patent and that said Letters Patent is hereby corrected as shown below:

Col. 11, line 60    Change "low" to --high--.
Claim 5

Signed and Sealed this

Eleventh Day of October, 1994

Attest:

BRUCE LEHMAN

Attesting Officer    Commissioner of Patents and Trademarks